United States Patent
Zhang et al.

(10) Patent No.: US 11,240,019 B2
(45) Date of Patent: Feb. 1, 2022

(54) METHOD, DEVICE, AND SYSTEM FOR DERIVING KEYS

(75) Inventors: Aiqin Zhang, Shanghai (CN); Jing Chen, Shenzhen (CN); Xiaoyu Bi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/323,840

(22) Filed: Dec. 13, 2011

(65) Prior Publication Data

US 2012/0077501 A1  Mar. 29, 2012

Related U.S. Application Data

(63) Continuation of application No. PCT/CN2010/074559, filed on Jun. 26, 2010.

(30) Foreign Application Priority Data

Jun. 26, 2009 (CN) .......................... 200910148423.7

(51) Int. Cl.
*H04L 9/08* (2006.01)
*H04L 29/06* (2006.01)
(Continued)

(52) U.S. Cl.
CPC ............ *H04L 9/0869* (2013.01); *H04L 63/06* (2013.01); *H04W 12/041* (2021.01);
(Continued)

(58) Field of Classification Search
CPC ............ H04W 12/04; H04W 36/0038; H04W 36/0033; H04W 36/00; H04W 12/0204;
(Continued)

(56) References Cited

U.S. PATENT DOCUMENTS 6,918,035 B1   7/2005  Patel
7,260,721 B2*  8/2007  Tanaka et al. ................ 713/170
(Continued)

FOREIGN PATENT DOCUMENTS

CN   101094065 A   12/2007
CN   101232731 A    7/2008
(Continued)

OTHER PUBLICATIONS

Nokia Corporation, 3GPP 33.401 CR, Sep. 24, 2008, 3GPP TSG-SA WG3 Meeting #52bis.*
(Continued)

*Primary Examiner* — Wesley L Kim
*Assistant Examiner* — Hung K Du
(74) *Attorney, Agent, or Firm* — Huawei Technologies Co., Ltd.

(57) ABSTRACT

Method, device, and system for deriving keys are provided in the field of mobile communications technologies. The method for deriving keys may be used, for example, in a handover process of a User Equipment (UE) from an Evolved Universal Terrestrial Radio Access Network (EU-TRAN) to a Universal Terrestrial Radio Access Network (UTRAN). If a failure occurred in a first handover, the method ensures that the key derived by a source Mobility Management Entity (MME) for a second handover process of the UE is different from the key derived for the first handover process of the UE. This is done by changing input parameters used in the key derivation, so as to prevent the situation in the prior art that once the key used on one Radio Network Controller (RNC) is obtained, the keys on other RNCs can be derived accordingly, thereby enhancing the network security.

17 Claims, 8 Drawing Sheets

(51) Int. Cl.
  *H04W 12/041* (2021.01)
  *H04W 36/00* (2009.01)
  *H04W 88/14* (2009.01)
(52) U.S. Cl.
  CPC .... *H04L 2209/80* (2013.01); *H04L 2463/061* (2013.01); *H04W 36/0011* (2013.01); *H04W 88/14* (2013.01)
(58) Field of Classification Search
  CPC . H04W 36/0011; H04W 88/14; H04W 36/04; H04W 36/12; H04W 36/14; H04W 36/18; H04W 92/10; H04W 12/041; H04L 2463/061; H04L 63/06; H04L 63/205; H04L 9/0891; H04L 63/061; H04L 9/0869; H04L 2209/80
  USPC ....... 455/410, 411, 436, 437, 438, 443, 445; 726/6
  See application file for complete search history.

(56) References Cited

U.S. PATENT DOCUMENTS

| | | | |
|---|---|---|---|
| 2007/0192594 | A1 | 8/2007 | Lee |
| 2008/0137853 | A1* | 6/2008 | Mizikovsky .......... H04L 9/0836 380/247 |
| 2009/0022103 | A1* | 1/2009 | Shatsky ........................ 370/331 |
| 2009/0025060 | A1* | 1/2009 | Mukherjee et al. ............... 726/3 |
| 2009/0111428 | A1* | 4/2009 | Blommaert et al. .......... 455/411 |
| 2010/0098247 | A1* | 4/2010 | Suumaki ............... H04L 9/0866 380/44 |
| 2011/0092213 | A1* | 4/2011 | Forsberg ................. H04L 63/06 455/436 |
| 2011/0222690 | A1* | 9/2011 | Gan .............................. 380/272 |

FOREIGN PATENT DOCUMENTS

| | | |
|---|---|---|
| CN | 101232736 A | 7/2008 |
| CN | 101304311 A | 11/2008 |
| CN | 101355507 A | 1/2009 |
| EP | 2293609 A1 | 3/2011 |
| RU | 2007126323 A | 1/2009 |
| RU | 2373653 C2 | 11/2009 |
| WO | 2006120316 A1 | 11/2006 |
| WO | 2009056938 A2 | 5/2009 |

OTHER PUBLICATIONS

Gan Lu, Method and System For Generating A Key, Nov. 12, 2008, English Translation of Chinese Patent Application 200810120667.1, pp. 5-7.*
3GPP TS 23.216 V8.2.0 Release 8, 3$^{rd}$ Generation Partnership Project; Digital Cellular Telecommunications System (phase 2+); Universal Mobile Telecommunications System (UMTS); LTE; Single Radio Voice Call Continuity (SRVCC); Jan. 2009; pp. 17-19.*
Written opinion of corresponding PCT Patent Application No. PCT/CN2010/074559, dated Sep. 26, 2010, 3 pages total.
International search report for International application No. PCT/CN2010/074559, dated Oct. 28, 2010, total 4 pages.
Chinese office action for Chinese application No. 200910148423.7, dated Jul. 1, 2011,and an English translation thereof,total 11 pages.
200910148423.7 Search report (the same as the first Chinese office action for Chinese application No. 200910148423.7, dated Jul. 1, 2011), 7 pages total.
3GPP TSG-SA WG3 Meeting S3#55 meeting,S3-091060,"Correction of EPS AS/NAS Security Context definition", Shanghai, P.R. China, Apr. 11-15, 2009,5 pages total.
3GPP TSG-SA3 (Security),S3-091070,Meeting SA3#55, May 11-15, 2009, Shanghai, China,"Rules on concurrent runs of security procedures",Meeting SA3#55, May 11-15, 2009, Shanghai, China,2 pages total.
Search report of corresponding European Patent Application No. EP10791589.4, dated May 2, 2012, 9 pages total.
3GPP TS 33.401 V8.4.0: "3rd Generation Partnership Project; Specification Group Services and System Aspects 3GPP System Architecture Evolution (SAE): Security architecture; (Release 8)", Jun. 2009, 95 pages total.
Nokia Corporation et al., 3GPP TSG SA WG3 Security—S3#52, S3-080838: "Key freshness during mobility from E-UTRAN to UTRAN/GERAN," Sophia-Antipolis, France, Jun. 23-27, 2008, 8 pages total.
Qualcomm Europe, 3GPP TSG SA3 (Security), S3-091477: "Key freshness at E-UTRAN to UTRAN handover," Seattle, USA, Jul. 6-10, 2009, 1 page only.
Qualcomm Europe, 3GPP TSG SA WG3 Security—SA3 ad hoc, S3-091729: "Ensuring key freshness at handover from E-UTRAN to UTRAN/GERAN (Rel-9)," Sophia Antipolis, France, Sep. 28-30, 2009, 6 pages total.
Cover page of issued Chinese patent CN 101931951B wherein the references are cited in item 56, Nov. 7, 2012, 1 page only.
Office action issued in corresponding Australia application No. 2010265281,dated May 10, 2013,total 3 pages.
Office action issued in corresponding Russian application No. 2012102647, dated Feb. 5, 2013, and English translation thereof, total 15 pages.
3GPP TS 33.401 V8.3.1, "3rd Generation Partnership Project; Technical Specification Group Services and System Aspects; 3GPP System Architecture Evolution (SAE): Security architecture; (Release 8)," Mar. 2009,total 61 pages.
3GPP TSG SA WG3 Security-S3#52 S3-080840, Change Request, "IRAT key freshness from UTRAN to E-UTRAN",Nokia Corporation,Jun. 23-27, 2008,total 7 pages.
3GPP TS 24.301 V8.2.1,3rd Generation Partnership Project;Technical Specification Group Core Network and Terminals;Non-Access-Stratum (NAS) protocol for Evolved Packet System (EPS);Stage 3(Release 8),Jun. 2009,total 252 pages.
3GPP TS 23.216 V8.0.0,3rd Generation Partnership Project;Technical Specification Group Services and System Aspects;Single Radio Voice Call Continuity (SRVCC);Stage 2(Release 8),Jun. 2008,total 20 pages.
3GPP TS 24.301 V8.0.0,3rd Generation Partnership Project;Technical Specification Group Core Network and Terminals;Non-Access-Stratum (NAS) protocolfor Evolved Packet System (EPS);Stage 3(Release 8),Dec. 2008, total 221 pages.

* cited by examiner

METHOD, DEVICE, AND SYSTEM FOR DERIVING KEYS

CROSS-REFERENCE TO RELATED APPLICATIONS

This application is a continuation of International Application No PCT/CN2010/074559, filed on Jun. 26, 2010, which claims priority to Chinese Patent Application No. 200910148423.7, filed on Jun. 26, 2009, both of which are hereby incorporated by reference in their entireties.

FIELD OF THE INVENTION

The present invention relates to the field of communications technologies, and in particular, to a method, device, and system for deriving keys.

BACKGROUND OF THE INVENTION

A mobile communication system includes a radio access network. Examples of the radio access network include second generation mobile communication network, third generation mobile communication network, and Long Term Evolution (LTE) communication network.

When a User Equipment (UE) is handed over from a source network where the UE originally locates to a target network, a key of the target network may be derived from a key of the source network, thereby avoiding a process of authentication and key negotiation. As such, the UE and the target network each generates, through the same key parameter and algorithm, the key eventually used in the target network.

In a Universal Terrestrial Radio Access Network (UTRAN), the process of authentication and key negotiation generates a Ciphering Key (CK) and an Integrity Key (IK); and in an Evolved UTRAN (EUTRAN), the process of authentication and key negotiation generates a root key (Kasme).

Taking the handover of a UE from the EUTRAN to the UTRAN as an example, a base station (BS) originally serving the UE in the EUTRAN (referred to as a source BS below) initiates a network handover process; a Mobility Management Entity (MME) associated with the source BS (referred to as a source MME below), derives a key CK' || IK' of the UE in the target network according to a Key Derivation Function (KDF), an input parameter (i.e. a root key Kasme), and a Non-Access Stratum (NAS) downlink COUNT value in the current security context, and sends the derived key to the target UTRAN. The target network decides a security algorithm for the UE and returns the security algorithm to the UE. The UE synchronizes the key with the target network side according to the security algorithm.

In the above handover process of the UE from the EUTRAN to the UTRAN, the handover of the UE to the UTRAN may fail due to the failure of the connection of an air interface radio link, so that the UE is returned to the EUTRAN. The UE initiates a link reestablishment process to the BS currently serving the UE, that is, the BS where the UE currently locates (referred to as a current BS below) and after deciding to perform a handover, the current BS initiates a second handover process. In this case, the key derivation on the MME in the second handover process and the key derivation on the MME in the first handover process are both performed according to the root key Kasme and the current NAS downlink COUNT value, and therefore the calculated key CK' || IK' is the same. Further, the keys obtained during the handovers by several Radio Network Controllers (RNC) in a UMTS network through a target Serving GPRS Support Node (SGSN) may be the same. Once a key used on one RNC is obtained, keys on other RNCs can be derived accordingly, resulting in a network security risk.

SUMMARY OF THE INVENTION

The present invention is directed to, when a user equipment is handed over from a source radio access network to a target radio access network, a method, a device, and a system for deriving a key for use in the target radio access network. The invention enhances the network security.

An embodiment of the present invention provides a key derivation method. The method includes:
generating a random value;
using the random value and a root key as input parameters of a key derivation function (KDF) to derive a key for a user equipment (UE) in a target radio access network; or using the random value, a current NAS downlink COUNT value, and the root key as input parameters of the KDF to derive the key for the UE in the target radio access network.

Another embodiment of the present invention provides a key derivation method. The method includes:
receiving, by a UE, a Handover Command message;
if the Handover Command message includes a random value, using the random value and a root key as input parameters of a KDF to derive a key for the UE in a target radio access network; and
if the Handover Command message includes the random value and a current NAS downlink COUNT value, using the random value, the current NAS downlink COUNT value, and the root key as input parameters of the KDF to derive the key for the UE in the target radio access network.

A further embodiment of the present invention provides a key derivation method. The method includes:
obtaining a new NAS downlink COUNT value;
deriving a key for a UE in a target radio access network according to a KDF, a root key, and the new NAS downlink COUNT value; and
sending the new NAS downlink COUNT value to the UE, so that the UE derives a same key for use in the target radio access network.

Yet another embodiment of the present invention provides a key derivation method. The method includes:
receiving, by a UE, a Handover Command message, in which the Handover Command message includes a new NAS downlink COUNT value; and
deriving a key of the UE for use in a target radio access network according to a KDF, a root key, and the new NAS downlink COUNT value.

Yet a further embodiment of the present invention provides a key derivation method. The method includes:
receiving a Handover Required message, in which the Handover Required message includes a fresh value of a UE;
using the fresh value of the UE and a root key as input parameters of a KDF to derive a key of the UE for use in a target radio access network; or
using the fresh value of the UE, a current NAS downlink COUNT value, and the root key as input parameters of the KDF to derive the key of the UE for use in the target radio access network.

An embodiment of the present invention provides a key derivation method. The method includes:
sending, by a UE, a Radio Resource Control (RRC) Connection Reestablishment Request message, in which the RRC Connection Reestablishment Request message includes a fresh value of the UE;

using the fresh value of the UE and a root key as input parameters of a KDF to derive a key of the UE for use in a target radio access network when receiving a Handover Command message sent by a BS; and using the fresh value of the UE, a current NAS downlink COUNT value, and the root key as input parameters of the KDF to derive the key of the UE in the target radio access network if the Handover Command message includes the current NAS downlink COUNT value.

An embodiment of the present invention provides an MME. The MME includes:

a generating unit, configured to generate a random value; and a deriving unit, configured to use a root key and the random value generated by the generating unit as input parameters of a KDF to derive a key of a UE for use in a target radio access network; or use the random value, a current NAS downlink COUNT value, and the root key as the input parameters of the KDF to derive the key of the UE for use in the target radio access network.

An embodiment of the present invention provides a UE, where the UE includes:

a message receiving unit, configured to receive a Handover Command message;

a key deriving unit, configured to use a random value and a root key as input parameters of a KDF to derive a key of the UE in a target radio access network if the Handover Command message received by the message receiving unit includes the random value; and configured to use the random value, a current NAS downlink COUNT value, and the root key as input parameters of the KDF to derive the key of the UE in the target radio access network if the Handover Command message received by the message receiving unit includes the random value and the current NAS downlink COUNT value.

An embodiment of the present invention provides an MME, where the MME includes:

a count value obtaining unit, configured to obtain a new NAS downlink COUNT value;

a second deriving unit, configured to derive a key of a UE in a target radio access network according to a KDF, a root key, and the new NAS downlink COUNT value obtained by the count value obtaining unit; and a handover sending unit, configured to send the new NAS downlink COUNT value obtained by the count value obtaining unit to the UE, so that the UE derives the key in the target radio access network.

An embodiment of the present invention provides a UE, where the UE includes:

a second message receiving unit, configured to receive a Handover Command message, in which the Handover Command message includes a new NAS downlink COUNT value; and a second key deriving unit, configured to derive a key of the UE in a target radio access network according to a KDF, a root key, and the new NAS downlink COUNT value in the Handover Command message received by the second message receiving unit.

An embodiment of the present invention provides a communication system, where the communication system includes any one of the above MMEs.

The key derivation method, device, and system according to the embodiments of the present invention are applicable to the handover process of the UE from a source radio access network to a target radio access network, and particularly to the handover process from the EUTRAN to the UTRAN. In the case of failure of the first handover to the second handover, it is guaranteed that the key derived on the source MME in the first handover process of the UE is different from the key derived on the MME in the second handover process of the UE through changing the input parameters used in the key derivation, such as generating the random value, changing the current NAS downlink COUNT value, and obtaining the fresh value of the UE, so as to prevent the situation in the prior art that once the key used on one RNC is obtained, the keys on other RNCs can be derived accordingly, thereby enhancing the network security.

DETAILED DESCRIPTION

The embodiments of the present invention are applicable to the handover process of a UE from an EUTRAN to a UTRAN. The following method is used to enhance the network security in the embodiments of the present invention: an NAS downlink COUNT value used when key derivation is performed on a source MME during a first handover process of the UE is different from the NAS downlink COUNT value used when key derivation is performed on the MME during a second handover process of the UE, so that the keys generated during each handover process of the UE from the EUTRAN to the UTRAN are different, and the keys of the UE used on the RNC and SGSN in the target network are thus different. Therefore, the situation in the prior art that once the key used on one RNC is obtained, the keys used on other RNCs can be derived accordingly is avoided, thereby enhancing the network security.

Figure 1:
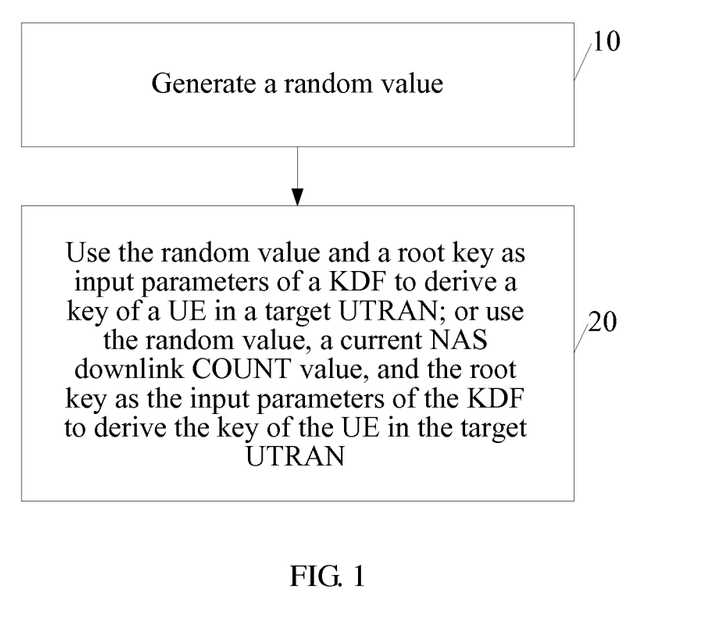
FIG. 1 is a flowchart of a key derivation method according to an embodiment of the present invention.

Referring to FIG. 1, an embodiment of the present invention provides a key derivation method, where the method includes the following steps:

Step 10: An MME generates a random value.

Step 20: The MME uses the random value and a root key as input parameters of a KDF to derive a key of a UE in a target UTRAN; or uses the random value, a current NAS downlink COUNT value, and the root key as input parameters of the KDF to derive the key of the UE in the target UTRAN.

For better understanding, the method, device, and system for deriving a key according to the embodiments of the present invention are described below through a specific network handover process.

Method Embodiment 1

Figure 2:
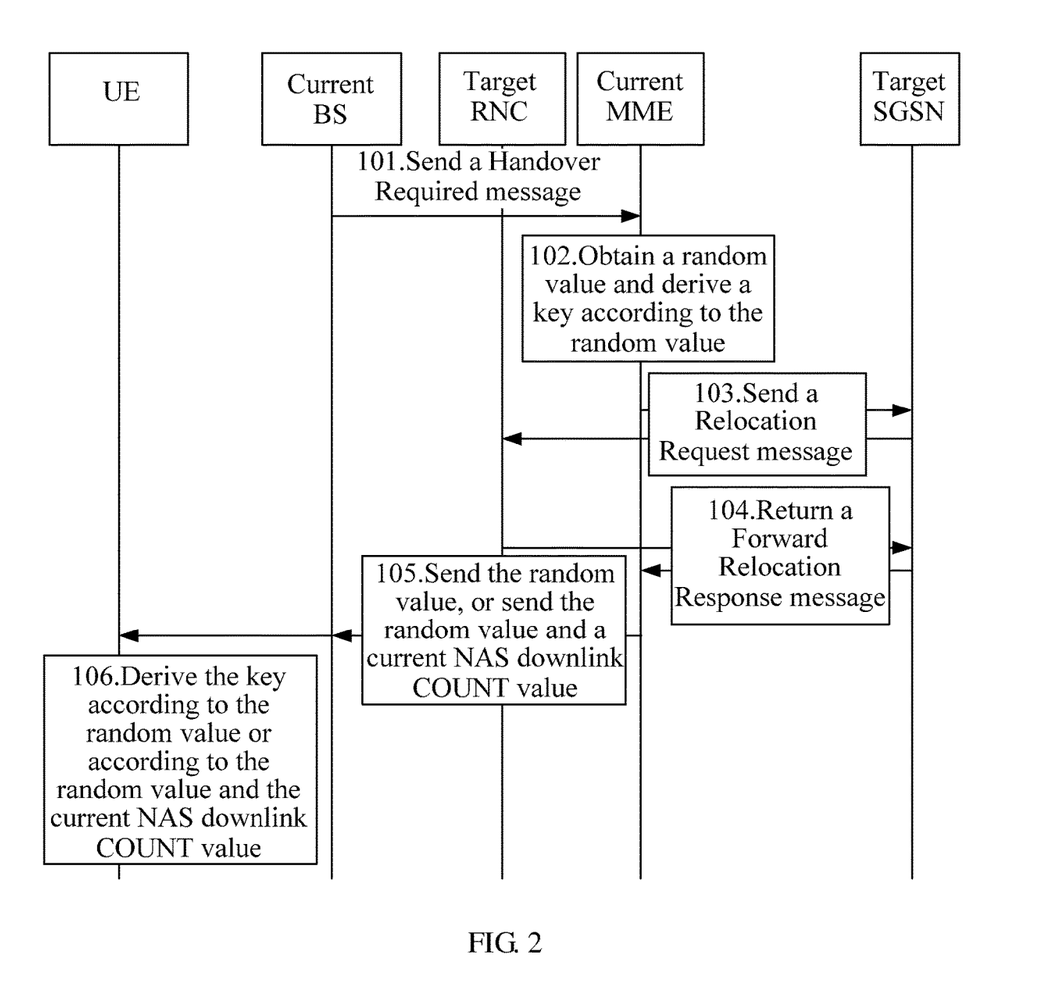
FIG. 2 is a flowchart of a key derivation method according to Method Embodiment 1 of the present invention.

A key derivation method is provided. An application scenario of this embodiment is a handover process of a UE from an EUTRAN to a UTRAN. A flowchart of the method according to this embodiment is shown in FIG. 2, which includes the flowing steps:

Step 101: A BS where a UE currently locates, namely a current BS, sends a "Handover Required" message to an MME associated with the current BS, namely a current MME.

Step 102: The current MME receives the Handover Required message, generates a random value, and uses the random value and a root key as input parameters of a KDF to derive a key of the UE in a target UTRAN.

It can be understood that the current MME may generate a random value at any time when receiving the Handover Required message. The random value, i.e. a fresh value of the MME, may be generated by an internal random number generating module of the MME.

The specific description of a KDF is that KDF=Hash Function (HMAC)-SHA-256(Key, S), in which Key is an input function, and S=FC || P0 || L0 || P1 || L1 || P2 || L2 || P3 || L3 || . . . ||Pn || Ln, where || represents concatenation, FC is used to distinguish different KDFs, P is a code of the input parameter, and L is the length of the input parameter corresponding to P. When the KDF is employed to derive a key CK' || IK', the CK' || IK'=KDF(KASME, S), and S=FC || P0 || L0, where FC is specifically 0×16, P0 is an NAS downlink COUNT value, and L0 is the length of the NAS downlink COUNT value (such as 0×00 0×04).

When deriving the key in this embodiment, the current MME may use the fresh value of the MME and the root key as the input parameters of the KDF to derive the key of the UE in the target UTRAN. In this case, the key CK' || IK'=KDF(Kasme, S), where S=FC || fresh value of MME || length of fresh value of MME.

Step 103: The current MME sends a Relocation Request message to a target RNC through a target SGSN, in which the Relocation Request message includes the key of the UE in the target UTRAN calculated in step 102, a corresponding KSI, and information such as a security capability of the UE in the UTRAN or GSM/EDGE Radio Access Network (GERAN).

Step 104: The target RNC sends a Forward Relocation Response message to the current MME through the target SGSN, in which the Forward Relocation Response message carries an algorithm identifier (ID) selected by the target RNC according to the security capability of the UE.

Step 105: The current MME sends the random value obtained in step 102 to the UE through a Handover Command message.

It can be understood that the MME may send the Handover Command message to the BS, in which the Handover Command message may include the generated random value, and further include information such as the algorithm ID and the current NAS downlink COUNT value; and the BS then sends information such as the random value, the current NAS downlink COUNT value, and the algorithm ID included in the Handover Command message to the UE through an "handover from EUTRAN" (HO from EUTRAN) command message.

Step 106: The UE receives the Handover Command message, derives the key according to the random value through the method in the above step 102, therefore achieving the synchronization of the key between the UE and the target network, and sends an HO Complete message to the target RNC to complete the network handover. It can be understood that the UE may calculate the specific CK' or IK' according to the algorithm ID.

It should be noted that in the first handover process of the UE to the UTRAN, the source MME may apply the key derivation method used in the network handover of this embodiment; and after the failure of the first handover of the UE, the MME may also apply the key derivation method of this embodiment to derive the key in the second handover of the UE.

In another instance, when performing the key derivation in step 102, the MME may use the random value, the current NAS downlink COUNT value, and the root key as the input parameters of the KDF to derive the key of the UE in the target UTRAN. In this case, the key CK' || IK'=KDF(Kasme, S), where S=FC || P0 || L0 || fresh value of MME || length of fresh value of MME. Then, in step 105, the MME sends the Handover Command message including the random value and the current NAS downlink COUNT value to the UE, and only four least significant bits of the current NAS downlink COUNT value may be included herein. Thereby, in step 106, the UE derives the key according to the random value and the current NAS downlink COUNT value by using the method in step 102.

In other instances, in the first handover of the UE, the source MME may save the key after deriving the key; and when the first handover of the UE succeeds, the saved key may be deleted. The source MME receives a Forward Relocation Complete message sent by the target SGSN after the UE sends the HO Complete message, which indicates that the first handover is successful. After receiving the Handover Required message, the MME determines whether the key of the UE in the target UTRAN is currently saved; if yes, the MME further determines whether the NAS downlink COUNT value corresponding to the currently saved key of the UE in the target UTRAN is consistent with the current NAS downlink COUNT value; and if consistent, the MME obtains a random value. When the MME determines that the key of the UE in the target UTRAN is not currently saved, a random value is obtained by using the method of this embodiment, and then the derivation is performed; and if the above consistency determination result is inconsistent, the derivation is performed by using the current derivation method.

It can be understood that in the second handover of the UE after the first handover of the UE fails and before the MME receives the Handover Required message again, an NAS process may be performed, and the NAS downlink COUNT value changes, so that when the above determination result is inconsistent, the MME may use the current NAS downlink COUNT value to derive the key, and the key derived in this manner is different from the key derived in the first handover; if the determination result is positive, a random value is obtained.

In the embodiment of the present invention, the key derivation method used in the handover of the UE from the EUTRAN to the UTRAN is that: when receiving the Handover Required message, the MME generates a random value, and derives the key of the UE in the target UTRAN according to the KDF, the root key, and the random value. In this case, the key derived in the second handover process after the failure of the first handover of the UE is surely different from the key derived in the first handover process, therefore avoiding the situation in the prior art and enhancing the network security.

Method Embodiment 2

Figure 3:
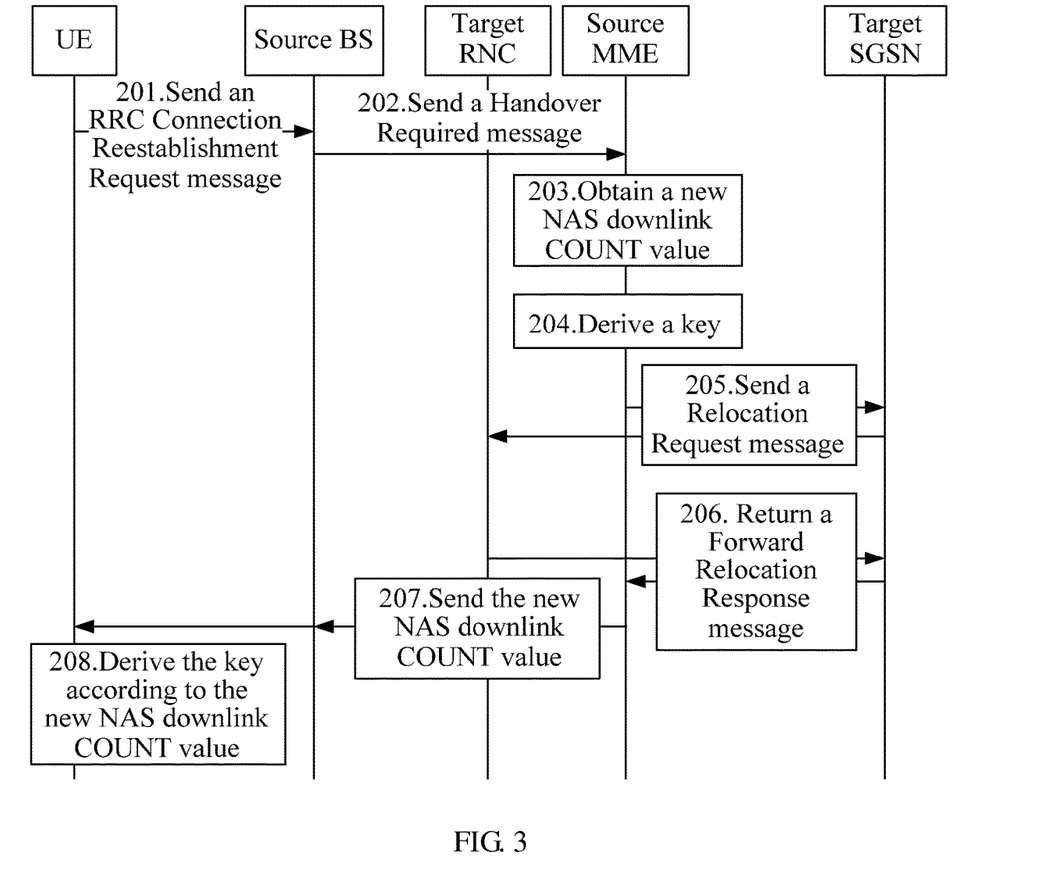
FIG. 3 is a flowchart of a key derivation method according to Method Embodiment 2 of the present invention.

A network handover method is provided. An application scenario of this embodiment is that in the handover process of a UE from an EUTRAN to a UTRAN, after a first handover of the UE fails, the UE returns to the original EUTRAN and selects an SGSN for a second handover. A flowchart of the method according to this embodiment is shown in FIG. 3. The method includes the following steps:

Step 201: The UE sends an RRC Connection Reestablishment Request message to a source BS, and performs an RRC connection reestablishment process.

It can be understood that after the first handover fails, the UE may return to a different cell under the source BS, or return to the same cell under the source BS, or return to a BS different from the source BS. In this embodiment, an example of the UE returning to the same cell under the source BS is used for illustration.

Step 202: After the RRC connection is reestablished, the source BS sends a Handover Required message to a source MME.

Step 203: The source MME receives the Handover Required message, and obtains a new NAS downlink COUNT value, in which the new NAS downlink COUNT value is different from a current NAS downlink COUNT value.

When obtaining the new NAS downlink COUNT value, the source MME may obtain the new NAS downlink COUNT value in following way:

adding a certain value to the current NAS downlink COUNT value, such as adding 1; or sending an NAS message, such as an NAS Security Mode Command (SMC) message, to the UE, so that the currently saved NAS downlink COUNT value is added by 1, and the NAS downlink COUNT value after the NAS message is sent is used as the new NAS downlink COUNT value.

Step 204: The source MME derives the key of the UE in a target UTRAN according to a KDF, a root key, and the new NAS downlink COUNT value.

The key derived by the source MME CK' || IK'=KDF (Kasme, S), where S=FC || new AS downlink COUNT value || length of new AS downlink COUNT value.

Step 205: The source MME sends a Relocation Request message to a target RNC through the target SGSN, in which the Relocation Request message includes the key of the UE in the target UTRAN calculated in step 204.

Step 206: The target RNC sends a Forward Relocation Response message to the source MME through the target SGSN, in which the Forward Relocation Response message carries an algorithm ID selected by the target RNC according to a security capability of the UE.

Step 207: The source MME sends the new NAS downlink COUNT value to the UE through a Handover Command message, in which only four least significant bits of the new NAS downlink COUNT value may be sent to the UE.

It can be understood that the MME may send the Handover Command message to the BS, in which the Handover Command message may include the new NAS downlink COUNT value, and may also include information such as an algorithm ID; and the BS then sends the new NAS downlink COUNT value to the UE through an HO from EUTRAN command message.

Step 208: The UE receives the Handover Command message, derives the key according to the KDF, the root key, and the new NAS downlink COUNT value by using the method in the above step 204, therefore achieving the synchronization of the key between the UE and the target network, and sends an HO Complete message to the target RNC to complete the network handover.

In other instances, in the first handover process of the UE, the source MME may save the key after the key derivation, and when receiving a Forward Relocation Complete message sent by the target SGSN, the source MME may delete the saved key. Therefore, before performing step 203, the source MME determines whether the key of the UE in the target UTRAN is currently saved; if yes, further determines whether the NAS downlink COUNT value corresponding to the currently saved key of the UE in the target UTRAN is consistent with the current NAS downlink COUNT value; and if consistent, performs step 203 to obtain the new NAS downlink COUNT value. When the source MME determines that the key of the UE in the target UTRAN is not currently saved, the MME may perform step 203 to obtain the new NAS downlink COUNT value; and if the above consistency determination result is inconsistent, the MME performs the derivation according to the current derivation method.

It can be understood that in the second handover of the UE after the first handover of the UE fails and before the source MME receives the Handover Required message again, an NAS process may be performed, and the NAS downlink COUNT value changes, so that when the above determination result is inconsistent, the source MME may use the current NAS downlink COUNT value to derive the key, and the key derived in this manner is different from the key derived in the first handover; if the determination result is positive, the key derivation is performed after the new NAS downlink COUNT value is obtained.

In an embodiment of the present invention, two state machines are set in the source MME, respectively for the key derivation incapable of using the saved NAS downlink COUNT value and the key derivation capable of using the saved NAS downlink COUNT value, and are respectively indicated by State 0 and State 1. When the source MME receives the Handover Required message, State 0 is set; and when the MME goes through a certain internal process and satisfies a preset condition, State 1 is set, that is, the key derivation can be performed, in which the preset condition includes: the MME receives a Forward Relocation Complete message, the current NAS downlink COUNT value is added by a certain value, and the MME delivers an NAS message. For example, after the MME receives the Handover Required message and delivers the NAS message, the key derivation can be performed.

In the embodiment of the present invention, in the handover process of the UE from the EUTRAN to the UTRAN, after the first handover fails, the key derivation method in the second network handover is that, after receiving the Handover Required message, the source MME obtains the new NAS downlink COUNT value different from the current NAS downlink COUNT value, and derives the key of the UE in the target UTRAN according to the KDF, the root key, and the new NAS downlink COUNT value. In this manner, the key derived in the second handover process is surely different from the key derived in the first handover process, therefore avoiding the situation in the prior art and enhancing the network security.

Method Embodiment 3

Figure 4:
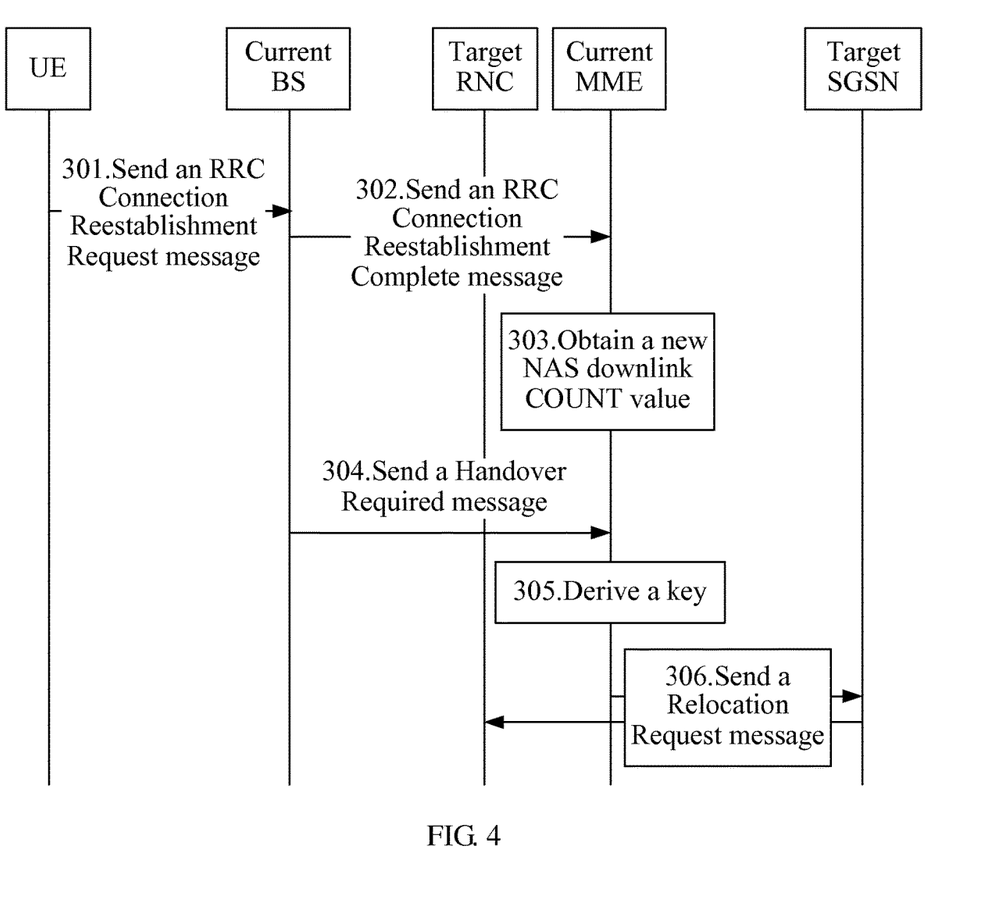
FIG. 4 is a flowchart of a key derivation method according to Method Embodiment 3 of the present invention.

A key derivation method is provided. An application scenario of this embodiment is that in the handover process of a UE from an EUTRAN to a UTRAN, after a first handover of the UE fails, the UE returns to the original EUTRAN and selects an SGSN for a second handover. A flowchart of the method is shown in FIG. 4, which includes the following steps:

Step 301: The UE sends an RRC Connection Reestablishment Request message to a BS where the UE currently locates, namely a current BS, to perform an RRC connection reestablishment process.

It can be understood that after the first handover fails, the UE may return to a different cell under a source BS, or return to the same cell under the source BS, or return to a BS different from the source BS.

Step 302: After the RRC connection is reestablished, the current BS sends an RRC Connection Reestablishment Complete message to an MME associated with the current BS, namely a current MME.

It can be understood that the RRC Connection Reestablishment Complete message may be an HO Notify message, or may be a Path Switch message. Specifically, if the UE returns to the different cell under the source BS, the current BS, namely the source BS, may send the HO Notify message to the current MME to indicate that the connection reestablishment is completed; if the UE returns to the BS different from the source BS, the current BS may send the Path Switch message to the current MME.

Step 303: The current MME receives the RRC Connection Reestablishment Complete message sent by the current BS, and obtains a new NAS downlink COUNT value, in which the new NAS downlink COUNT value is different from a current NAS downlink COUNT value.

The obtaining method is the same as that described in step 203 of Method Embodiment 2, and the details are not described herein again.

Step 304: The current BS determines to perform the second handover and sends a Handover Required message to the current MME.

Step 305: After receiving the Handover Required message, the current MME derives the key of the UE in the target UTRAN according to a KDF, a root key, and the new NAS downlink COUNT value obtained in step 303, and sends the derived key to a target RNC.

After the key is sent to the target RNC, the network handover method is the same as the method of Method Embodiment 2 after step 205, and the details are not described herein again. In addition, step 303 and step 304 in this embodiment may be performed at the same time, but preferably performed in sequence, and therefore, the network handover process may not be affected, which saves the network handover time.

The key derivation method in the embodiment of the present invention is that, during the handover of the UE from the EUTRAN to the UTRAN, after the first handover fails and before the second handover of the UE, the MME obtains the new NAS downlink COUNT value different from the current NAS downlink COUNT value, so that after the MME receives the Handover Required message, the derived and calculated key of the UE in the target UTRAN is surely different from the key derived in the first handover process, therefore avoiding the situation in the prior art and enhancing the network security.

In addition, because the obtaining of the new NAS downlink COUNT value is performed before the second handover, the network handover may not be affected, and compared with Method Embodiment 1, the network handover time is reduced.

Method Embodiment 4

Figure 5:
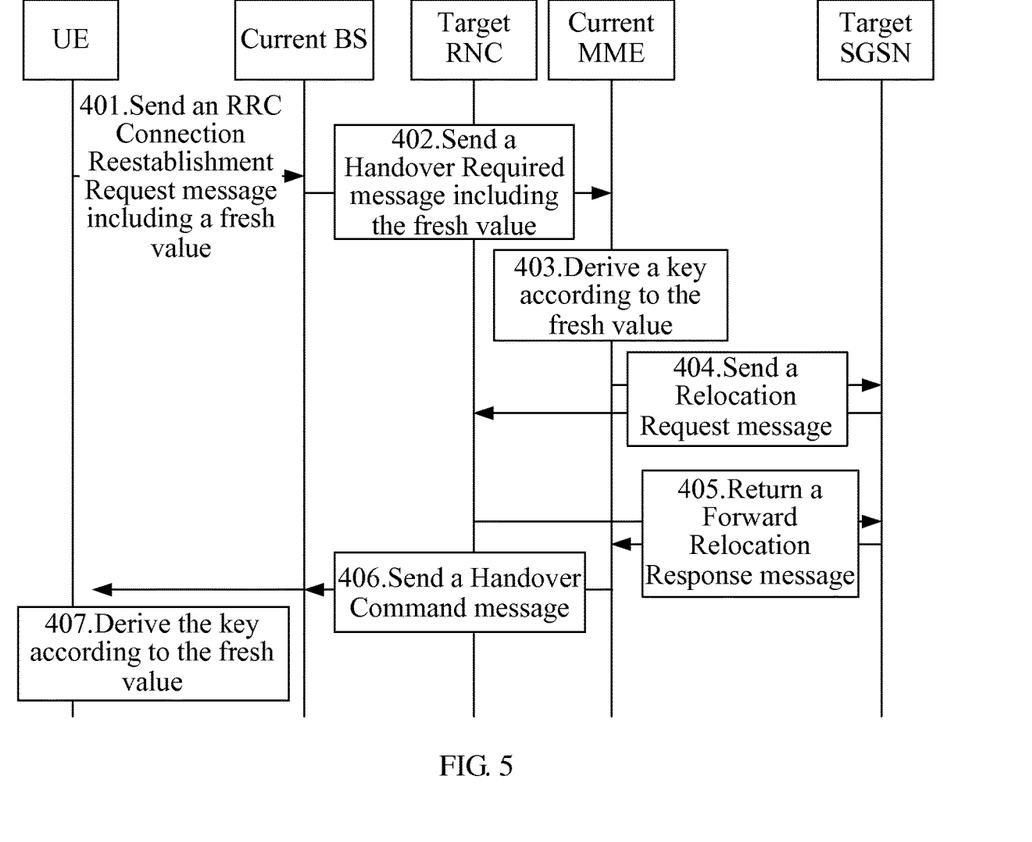
FIG. 5 is a flowchart of a key derivation method according to Method Embodiment 4 of the present invention.

A key derivation method is provided. An application scenario of this embodiment is that in the handover process of a UE from an EUTRAN to a UTRAN, after a first handover of the UE fails, the UE returns to the original EUTRAN for a second handover. A flowchart of the method is shown in FIG. 5, which includes the following steps:

Step 401: The UE sends an RRC Connection Reestablishment Request message to a BS where the UE currently locates, namely a current BS, in which the RRC Connection Reestablishment Request message may include a 2-bit spare to carry a fresh value of the UE, namely a random value.

Step 402: After receiving the RRC Connection Reestablishment Request message, the current BS determines to perform the second handover of the UE, and sends, through a Handover Required message, the fresh value of the UE to the MME associated with the current BS, namely the current MME, to derive the key of the UE in the target UTRAN.

Step 403: After receiving the Handover Required message, the current MME uses the fresh value of the UE included in the Handover Required message and a root key as input parameters of a KDF to derive the key of the UE in the target UTRAN.

When deriving the key, the current MME may use the fresh value of the UE and the root key as the input parameters of the KDF to derive the key of the UE in the target UTRAN; and in this case, the key CK' ∥ IK'=KDF(Kasme, S), where S=FC ∥ fresh value of UE ∥ length of fresh value of UE.

Step 404: The current MME sends a Relocation Request message to a target RNC through a target SGSN, in which the Relocation Request message includes the key of the UE in the target UTRAN calculated in step 403.

Step 405: The target RNC sends a Forward Relocation Response message to the current MME through the target SGSN, in which the Forward Relocation Response message carries an algorithm ID selected by the target RNC according to a security capability of the UE.

Step 406: The current MME sends a Handover Command message to the BS, in which the Handover Command message may include the current NAS downlink COUNT value, and may further include information such as an algorithm ID; and then the BS sends the Handover Command message to the UE, in which the Handover Command message may include the current NAS downlink COUNT value.

Step 407: The UE receives the Handover Command message, and derives the key according to the fresh value of the UE through the method in the above step 403, therefore achieving the synchronization of the key between the UE and the target network.

In another specific embodiment, in step 403, the MME may use the fresh value of the UE, the current NAS downlink COUNT value, and the root key as the input parameters of the KDF to derive the key of the UE in the target UTRAN. In this case, the key CK' ∥ IK'=KDF(Kasme, S), where S=FC ∥ P0 ∥ L0 ∥ fresh value of UE ∥ length of fresh value of UE, so that the Handover Command message sent to the UE in step 406 must include the current NAS downlink COUNT value, and may include the four least significant bits; and in step 407, the UE may derive the key according to the fresh value of the UE and the current NAS downlink COUNT value by using the method in step 403.

It can be understood that the subsequent process is similar to what is described above, and the details are not described herein again.

In other specific embodiments, in the first handover process of the UE, the source MME may save the key after the key derivation, and when receiving a Forward Relocation Complete message sent by the target SGSN, the source MME may delete the saved key. Therefore, after receiving the Handover Required message, the current MME determines whether the key of the UE in the target UTRAN is currently saved; if yes, further determines whether the NAS downlink COUNT value corresponding to the currently saved key of the UE in the target UTRAN is consistent with the current NAS downlink COUNT value; and if consistent, the key derivation is performed according to the method of this embodiment. Definitely, when the MME determines that the key of the UE in the target UTRAN is not currently saved, the derivation is performed according to the method of this embodiment; and if the above consistency determination result is inconsistent, the derivation is performed according to the derivation method in the prior art.

It can be understood that in the second handover of the UE after the first handover of the UE fails, before the MME receives the Handover Required message again, an NAS process may be performed, and the NAS downlink COUNT value changes, so that when the above determination result is inconsistent, the MME may use the current NAS downlink COUNT value to derive the key, and the key derived in this manner is different from the key derived in the first handover; if the determination result is positive, the key derivation is performed according to the method of this embodiment.

The key derivation method in the embodiment of the present invention is that, in the handover process of the UE from the EUTRAN to the UTRAN, when the UE performs the second handover after the first handover fails, the UE calculates a fresh value, and sends the fresh value to the current MME through the current BS; after receiving the Handover Required message, the current MME derives the key of the UE in the target UTRAN according to the fresh value of the UE, the KDF, the root key, and the current NAS downlink COUNT value included in the Handover Required message. In this manner, the key derived in the second handover process is different from the key derived in the first handover process, therefore avoiding the situation in the prior art and enhancing the network security.

Method Embodiment 5

Figure 6:
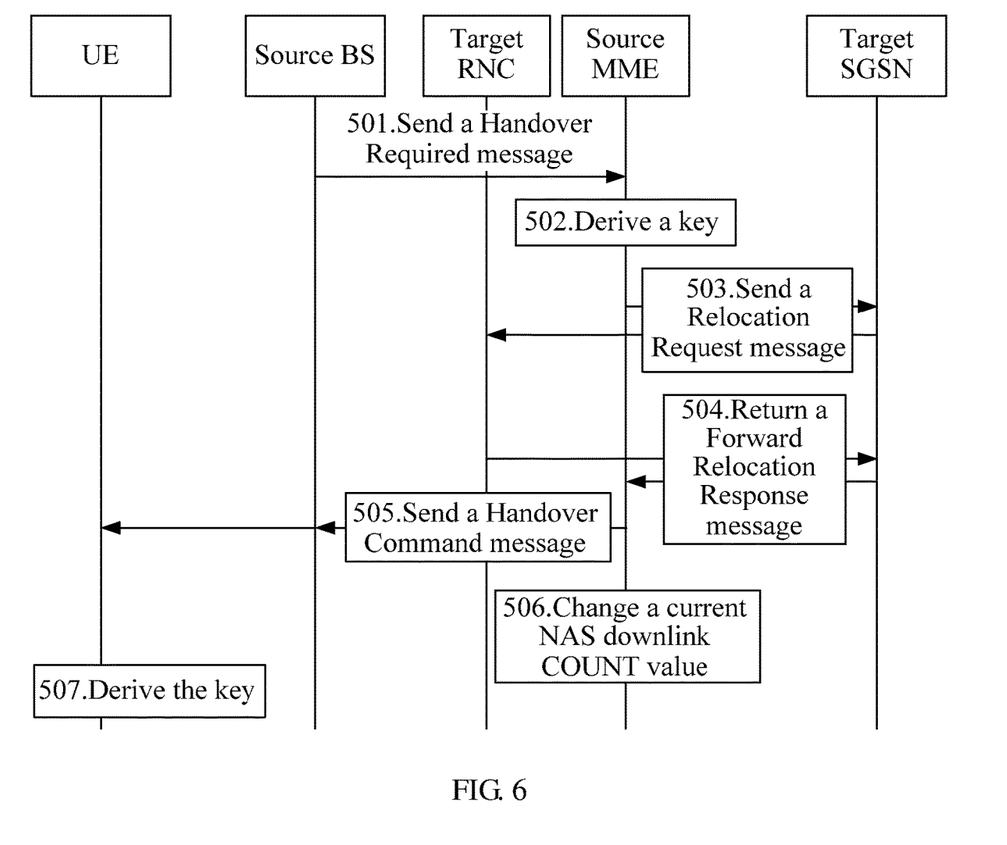
FIG. 6 is a flowchart of a key derivation method according to Method Embodiment 5 of the present invention.

A key derivation method is provided. An application scenario of this embodiment is that in the handover process of a UE from an EUTRAN to a UTRAN, a BS in the original EUTRAN of the UE, namely a source BS, initiates a network handover. A flow chart of the method is shown in FIG. 6, which includes the following steps.

Step 501: The source BS sends a Handover Required message to a source MME.

Step 502: The source MME derives CK'|| IK' according to a KDF, a root key Kasme, and an NAS downlink COUNT value in a current security context.

Step 503: The source MME sends a Relocation Request message to a target RNC through a target SGSN, in which the Relocation Request message includes CK' || IK', KSI, and information such as a security capability of the UTRAN/GERAN of the UE.

Step 504: The target RNC sends a Forward Relocation Response message to the source MME through the target SGSN, in which the Forward Relocation Response message carries an algorithm ID of the security capability of the UE.

Step 505: The source MME completes a handover preparation process, and sends a Handover Command message to the UE through the source BS, in which the Handover Command message carries the current NAS downlink COUNT value and the algorithm ID of the security capability.

Step 506: The source MME changes the current NAS downlink COUNT value, for example, adding a certain value to the current NAS downlink COUNT value, such as adding 1, and saves the changed NAS downlink COUNT value; the changed NAS downlink COUNT value is used to derive the key of the UE in the target UTRAN.

Step 507: After receiving the Handover Command message, the UE derives and calculates the key CK' || IK' according to the KDF and the NAS downlink COUNT value that is included in the Handover Command message, so that the key of the UE and the target network is synchronized, and an HO Complete message is sent to the target RNC.

It can be understood that in the first handover process in this embodiment, after the source MME sends the Handover Command message, the NAS downlink COUNT value is changed, so that after the first handover of the UE fails, the NAS downlink COUNT value saved in step 506 and used by the MME for the key derivation in the second handover is surely different from the NAS downlink COUNT value used in the first handover, and therefore the keys derived and calculated in the two handovers are different, which achieves the purpose of enhancing the network security.

Device Embodiment 1

Figure 7:
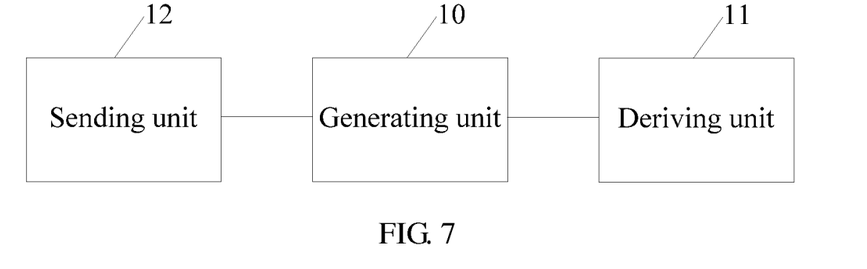
FIG. 7 is a block diagram of a logic structure of an MME according to Device Embodiment 1 of the present invention.

A physical device, i.e. a network entity called Mobility Management Entity (MME) is provided. A block diagram of the MME is shown in FIG. 7, which includes a generating unit 10, a deriving unit 11, and a sending unit 12.

The generating unit 10 is configured to generate a random value.

The deriving unit 11 is configured to use a root key and the random value that is generated by the generating unit 10 as input parameters of a KDF to derive a key of a UE in a target UTRAN.

The sending unit 12 is configured to send the random value generated by the generating unit 10 to the UE, so that the UE derives the key in the target UTRAN according to the random value.

The deriving unit 11 is further configured to use a current NAS downlink COUNT value, the root key, and the random value generated by the generating unit 10 as the input parameters of the KDF to derive the key of the UE in the target UTRAN; and the sending unit 12 is configured to send the current NAS downlink COUNT value and the random value generated by the generating unit 10 to the UE, so that the UE derives the key in the target UTRAN according to the random value and the current NAS downlink COUNT value.

In this embodiment, the generating unit 10 of the MME generates a random value, and the deriving unit 11 derives the key according to the random value, so that in the handover process of the UE from the EUTRAN to the UTRAN, after the first handover fails, the key derived by the MME in the second handover process is surely different from the key derived in the first handover process, therefore avoiding the situation in the prior art and enhancing the network security.

Device Embodiment 2

Figure 8:
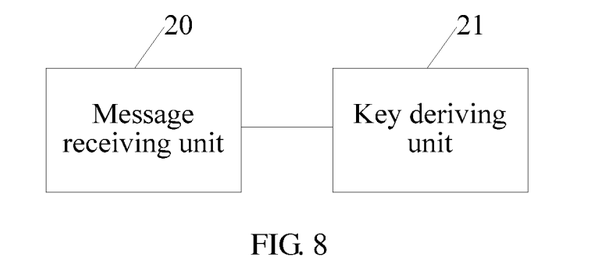
FIG. 8 is a block diagram of a logic structure of a UE according to Device Embodiment 2 of the present invention.

A UE is provided. A block diagram of the UE is shown in FIG. 8, which includes a message receiving unit 20 and a key deriving unit 21.

The message receiving unit 20 is configured to receive a Handover Command message.

The key deriving unit 21 is configured to use a random value and a root key as input parameters of a KDF to derive the key of the UE in a target UTRAN if the Handover Command message received by the message receiving unit 20 includes the random value; and configured to use the random value, a current NAS downlink COUNT value, and the root key as the input parameters of the KDF to derive the key of the UE in the target UTRAN if the Handover Command message received by the message receiving unit 20 includes the random value and the current NAS downlink COUNT value.

Device Embodiment 3

Figure 9:
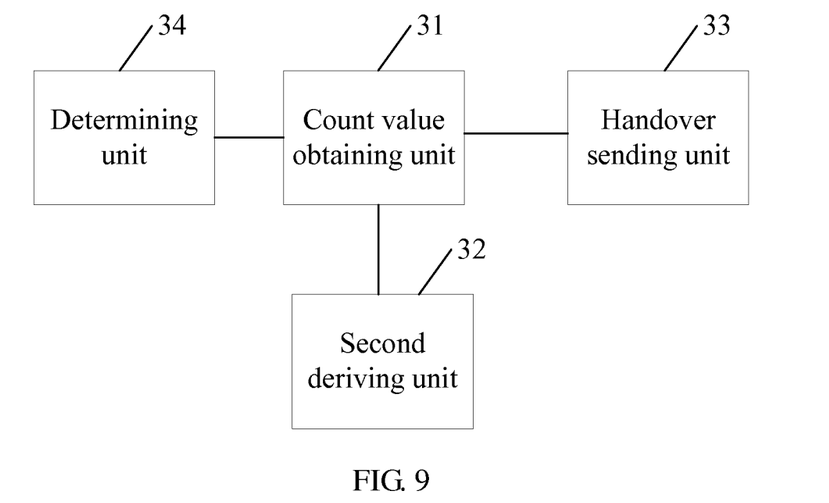
FIG. 9 is a block diagram of a logic structure of an MME according to Device Embodiment 3 of the present invention.

An MME is provided. A block diagram of the MME is shown in FIG. 9, which includes a count value obtaining unit 31, a second deriving unit 32, and a handover sending unit 33.

The count value obtaining unit 31 is configured to obtain a new NAS downlink COUNT value.

When the new NAS downlink COUNT value is obtained, an NAS message may be sent to a UE, such as an NAS SMC message, so that the currently saved NAS downlink COUNT value may be added by 1, and the NAS downlink COUNT value after the NAS message is sent may be used as the new NAS downlink COUNT value. A certain value, such as 1, may be added to the current NAS downlink COUNT value.

The second deriving unit 32 is configured to derive a key of the UE in a target UTRAN according to a KDF, a root key, and the new NAS downlink COUNT value that is obtained by the count value obtaining unit 31.

The handover sending unit 33 is configured to send the new NAS downlink COUNT value obtained by the count value obtaining unit 31 to the UE through a BS where the UE currently locates, so that the UE derives the key in the target UTRAN.

It can be understood that in other specific embodiments, the MME may further include: a determination unit 34, configured to determine whether the key of the UE in the target UTRAN is currently saved; and if yes, further determine whether the NAS downlink COUNT value corresponding to the currently saved key of the UE in the target UTRAN is consistent with the current NAS downlink COUNT value.

When the determination result of the determination unit 34 is that the NAS downlink COUNT value corresponding to the currently saved key of the UE in the target UTRAN is consistent with the current NAS downlink COUNT value, the count value obtaining unit 31 obtains the new NAS downlink COUNT value.

The count value obtaining unit 31 in the MME according to the embodiment of the present invention obtains the new NAS downlink COUNT value different from the current NAS downlink COUNT value; and finally the second deriving unit 32 derives the key of the UE in the target UTRAN according to the KDF, the root key, and the new NAS downlink COUNT value, and the handover sending unit 33 sends the new NAS downlink COUNT value to the UE. In this manner, in the handover process of the UE from the EUTRAN to the UTRAN, after the first handover fails, the key derived by the MME in the second handover process is surely different from the key derived in the first handover process, therefore avoiding the situation in the prior art and enhancing the network security.

In addition, it can be understood that after the first handover of the UE fails, during the second handover of the UE, before the MME receives the Handover Required message again, an NAS process may be performed, and the NAS downlink COUNT value therefore changes. The MME further includes the determination unit 34 for consistency determination. If the consistency determination result is inconsistent, the current NAS downlink COUNT value may be used to derive the key; if the consistency determination result is positive, the key is derived after the count value obtaining unit 31 obtains the new NAS downlink COUNT value. Therefore, the obtaining of the new NAS downlink COUNT value is reduced when the consistency determination result is inconsistent, thereby saving the load of the MME.

Device Embodiment 4

Figure 10:
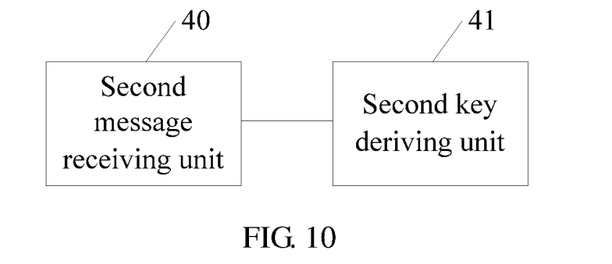
FIG. 10 is a block diagram of a logic structure of a UE according to Device Embodiment 4 of the present invention.

A UE is provided. A block diagram of the UE is shown in FIG. 10, which includes a second message receiving unit 40 and a second key deriving unit 41.

The second message receiving unit 40 is configured to receive a Handover Command message, in which the Handover Command message includes a new NAS downlink COUNT value.

The second key deriving unit 41 is configured to derive a key of the UE in a target UTRAN according to a KDF, a root key, and the new NAS downlink COUNT value in the Handover Command message received by the second message receiving unit 40.

Device Embodiment 5

Figure 11:
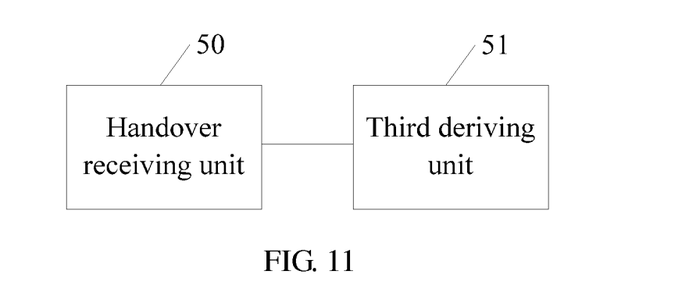
FIG. 11 is a block diagram of a logic structure of an MME according to Device Embodiment 5 of the present invention.

An MME is provided. A block diagram of the MME is shown in FIG. 11, which includes a handover receiving unit 50 and a third deriving unit 51.

The handover receiving unit 50 is configured to receive a Handover Required message, in which the Handover Required message includes a fresh value of a UE.

The third deriving unit 51 is configured to use a root key and the fresh value of the UE in the Handover Required message received by the handover receiving unit 50 as input parameters of a KDF to derive the key of the UE in a target UTRAN, or use a current NAS downlink COUNT value, the root key, and the fresh value of the UE in the Handover Required message received by the handover receiving unit 50 as the input parameters of the KDF to derive the key of the UE in the target UTRAN.

In this embodiment, after the handover receiving unit 50 of the MME receives the Handover Required message, the third deriving unit 51 derives the key according to the fresh value of the UE included in the Handover Required message, so that in the handover process of the UE from the EUTRAN to the UTRAN, after the first handover fails, the key derived by the MME in the second handover process is surely different from the key derived in the first handover process, therefore avoiding the situation in the prior art and enhancing the network security.

Device Embodiment 6

Figure 12:
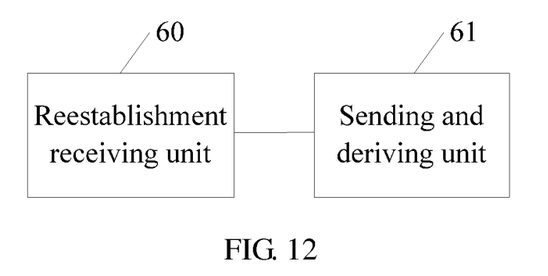
FIG. 12 is a block diagram of a logic structure of a BS according to Device Embodiment 6 of the present invention.

A BS is provided. A block diagram of the BS is shown in FIG. 12, which includes a reestablishment receiving unit 60 and a sending and deriving unit 61.

The reestablishment receiving unit 60 is configured to receive an RRC Connection Reestablishment Request message, in which the RRC Connection Reestablishment Request message includes a fresh value of a UE.

The sending and deriving unit 61 is configured to send the fresh value of the UE included in the RRC Connection Reestablishment Request message received by the reestablishment receiving unit 60 to an MME through a Handover Required message when a second handover of the UE is determined, so as to facilitate the MME to derive the key of the UE in the target UTRAN.

Device Embodiment 7

Figure 13:
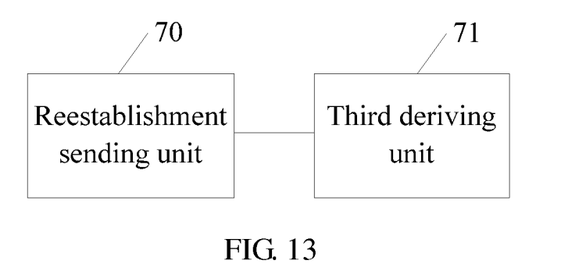
FIG. 13 is a block diagram of a logic structure of a UE according to Device Embodiment 7 of the present invention.

A UE is provided. A block diagram of the UE is shown in FIG. 13, which includes a reestablishment sending unit 71 and a third key deriving unit 72.

The reestablishment sending unit 71 is configured to send an RRC Connection Reestablishment Request message, in which RRC Connection Reestablishment Request message includes a fresh value of a UE.

The third key deriving unit 72 is configured to use the fresh value of the UE and a root key as input parameters of a KDF to derive the key of the UE in a target UTRAN when receiving a Handover Command message, and to use the fresh value of the UE, a current NAS downlink COUNT value, and the root key as the input parameters of the KDF to derive the key of the UE in the target UTRAN if the Handover Command message includes the current NAS downlink COUNT value.

Device Embodiment 8

Figure 14:
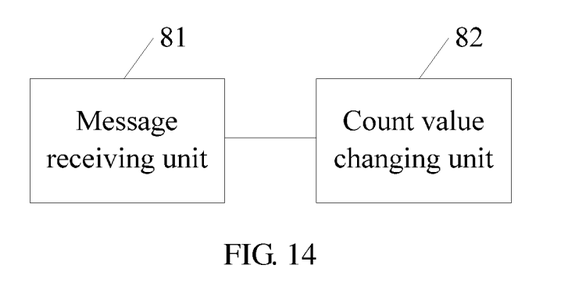
FIG. 14 is a block diagram of a logic structure of an MME according to Device Embodiment 8 of the present invention.

An MME is provided. A block diagram of the MME is shown in FIG. 14, which includes a message receiving unit 81 and a count value changing unit 82.

The message receiving unit 81 is configured to receive a Forward Relocation Response message sent by a target SGSN.

The count value changing unit 82 is configured to change a current NAS downlink COUNT value and save the changed NAS downlink COUNT value after sending a Handover Command message to a UE, in which the changed NAS downlink COUNT value is used to derive a key of the UE in a target UTRAN.

It can be understood that: After the message receiving unit 81 in the MME receives the Forward Relocation Response message sent by the SGSN in the target network, which indicates that the target network has performed relocation for the UE, the handover can be performed. In this case, after the count value changing unit 82 sends the Handover Command message, the current NAS downlink COUNT value is changed.

Therefore, after the first handover of the UE fails, during a second handover, the MME uses the NAS downlink COUNT value saved in the MME for deriving the key, which guarantees that the NAS downlink COUNT value is different from the NAS downlink COUNT value used in the first handover, so that the keys derived and calculated in the two handovers are different. Therefore, the purpose of enhancing the network security is achieved.

System Embodiment

A communication system is provided, which includes an MME. The MME is similar to any one of the MMEs in Device Embodiments 1, 3, 5 and 8, and the key derivation method according to the above embodiments may be performed.

It can be understood that the communication system further includes other devices such as a UE and a BS, and the network security can be enhanced through the communication between the UE and the BS.

The key derivation method, device, and system according to the embodiments of the present invention are applicable to the handover process of the UE from the EUTRAN to the UTRAN. From the failure of the first handover to the second handover, it is guaranteed that the key derived on the source MME in the first handover process of the UE is different from the key derived on the MME in the second handover process of the UE by changing the input parameters used in the key derivation by the MME, such as generating the random value, changing the current NAS downlink COUNT value, and obtaining the fresh value of the UE, so as to prevent the situation in the prior art that once the key used on one RNC is obtained, the keys on other RNCs can be derived accordingly, thereby enhancing the network security.

Persons skilled in the art should understand that all or a part of the steps of the method according to the embodiments of the present invention may be implemented by a program instructing relevant hardware. The program may be stored in a computer readable storage medium, such as a Read Only Memory (ROM), a Random Access Memory (RAM), a magnetic disk, or an optical disk.

The method, device, and system for deriving keys are described in detail above. The principle and implementation of the present invention are described herein through specific examples. The description about the embodiments of the present invention is merely provided for ease of understanding of the method and core ideas of the present invention. Persons skilled in the art can make variations and modifications to the present invention in terms of the specific implementations and application scopes according to the ideas of the present invention. Therefore, the specification shall not be construed as a limit to the present invention.

What is claimed is:

1. A method for deriving a key, comprising:
  receiving, by a mobility management entity (MIME), a handover required message from a base station (BS) of a source radio access network in a first handover process from the source radio access network to a target radio access network;
  obtaining, by the MME, a first non-access stratum (NAS) downlink COUNT value in the first handover process;
  deriving, by the MME, a first key according to a key derivation function (KDF), a root key, and the first NAS downlink COUNT value in the first handover process, the first key including a ciphering key and an integrity key;
  sending, by the MME, at least a portion of the first NAS downlink COUNT value to a user equipment (UE) in the first handover process; and
  obtaining, by the MIME in the first handover process, a second NAS downlink COUNT value by incrementing a value to the first NAS downlink COUNT value, the second NAS downlink COUNT value being obtained in the absence of the MIME sending a NAS message, the second NAS downlink COUNT value being obtained after deriving the first key in the first handover process; and after the first handover process fails, deriving, by the MIME, a second key in a second handover process according to the KDF, the root key, and the second NAS downlink COUNT value.

2. The method according to claim 1, wherein the portion of the first NAS downlink COUNT value is four least significant bits.

3. The method according to claim 1, wherein the source radio access network is an Evolved Universal Terrestrial Radio Access Network (EUTRAN).

4. The method according to claim 3, wherein the target radio access network is a Universal Terrestrial Radio Access Network (UTRAN).

5. The method according to claim 4, wherein at least the portion of the first NAS downlink COUNT value is four least significant bits.

6. The method according to claim 5, wherein the value incremented to the first NAS downlink COUNT value is 1.

7. The method according to claim 6, further comprising: sending, by the MME, at least a portion of the second NAS downlink COUNT value to the UE in a second handover process.

8. The method according to claim 1, further comprising: sending, by the MME to the UE in the second handover process, at least a portion of the second NAS downlink COUNT value.

9. The method according to claim 1, wherein the value incremented to the first NAS downlink COUNT value is 1.

10. The method according to claim 1, wherein at least the portion of the first NAS downlink COUNT value is sent through a handover command message.

11. An apparatus operable to derive a key, comprising:
a receiver to receive a handover required message from a base station (BS) of a source radio access network in a first handover process from the source radio access network to a target radio access network;
at least one processor;
a memory connected to the at least one processor, the memory storing instructions that, when executed by the at least one processor, cause the apparatus to perform operations in the first handover process to:
obtain a first non-access stratum (NAS) downlink COUNT value, derive a first key according to a key derivation function (KDF), a root key, and the first NAS downlink COUNT value, the first key including a ciphering key and an integrity key, and obtain a second NAS downlink COUNT value by incrementing a value to the first NAS downlink COUNT, the second NAS downlink COUNT value being obtained in the absence of the apparatus sending a NAS message, the second NAS downlink COUNT being obtained after derivation of the first key in the first handover process, and after the first handover process fails, derive, in a second handover process, a second key according to the KDF, the root key, and the second NAS downlink COUNT value; and
a transmitter to transmit at least a portion of the first NAS downlink COUNT value in the first handover process.

12. The apparatus according to claim 11, wherein the portion of the first NAS downlink COUNT value is four least significant bits.

13. The apparatus according to claim 12, wherein the value incremented to the first NAS downlink COUNT value is 1.

14. The apparatus according to claim 13, wherein the transmitter is configured to send at least a portion of the second NAS downlink COUNT value to a user equipment (UE) in a second handover process.

15. The apparatus according to claim 11, wherein the value incremented to the first NAS downlink COUNT value is 1.

16. The apparatus according to claim 11, wherein the transmitter is configured to send at least a portion of the second NAS downlink COUNT value to a user equipment (UE) in a second handover process.

17. The apparatus according to claim 11, wherein the transmitter sends at least the portion of the plurality of bits of the first NAS downlink COUNT value through a handover command message.

* * * * *